United States Patent
Moilanen

(10) Patent No.: US 6,543,843 B1
(45) Date of Patent: Apr. 8, 2003

(54) FASTENER STRIP

(75) Inventor: Gerald Moilanen, Commerce Township, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/527,394

(22) Filed: Mar. 16, 2000

(51) Int. Cl.⁷ .............................................. A47C 27/00
(52) U.S. Cl. .................................. 297/218.5; 297/218.3
(58) Field of Search ........................ 297/218.3, 218.5, 297/218.1, 452.38; 24/326, 336, 531, 455, 453; 5/402, 410

(56) References Cited

U.S. PATENT DOCUMENTS

| | | | |
|---|---|---|---|
| 1,384,908 A | | 7/1921 | Lockwood |
| 2,120,036 A | | 6/1938 | Northup |
| 2,169,259 A | * | 8/1939 | Lakin |
| 2,589,901 A | | 3/1952 | Van Doren |
| 2,623,477 A | * | 12/1952 | Tuttle |
| 2,837,144 A | | 6/1958 | Heller |
| 3,066,435 A | | 12/1962 | Oddo et al. |
| 3,423,775 A | * | 1/1969 | Cockerill |
| 3,981,534 A | * | 9/1976 | Wilton |
| 5,117,537 A | * | 6/1992 | Hunter et al. |
| 5,338,092 A | | 8/1994 | Wiltsey et al. |
| 5,518,292 A | | 5/1996 | Cozzani |
| 5,560,677 A | | 10/1996 | Cykana et al. |
| 5,582,463 A | | 12/1996 | Linder et al. |
| 5,720,188 A | * | 2/1998 | Leeke et al. |
| 5,768,758 A | | 6/1998 | Deignan et al. |
| 5,820,212 A | | 10/1998 | Hoshino et al. |
| 5,820,213 A | | 10/1998 | Severinski et al. |
| 5,879,051 A | | 3/1999 | Cozzani |
| 5,931,538 A | | 8/1999 | Cayet et al. |
| 5,971,478 A | | 10/1999 | Hurite |

* cited by examiner

Primary Examiner—Milton Nelson, Jr.
(74) Attorney, Agent, or Firm—Foley & Lardner

(57) ABSTRACT

A fastener strip for a trim cover of a seat assembly including a base section and a tab section. The tab section includes a hinge portion connected to the base section and a body portion connected to the hinge portion. The base section, the tab section, the hinge portion, and the body portion are formed in a plane. The hinge portion allows the body portion to deflect from the plane. The body portion includes a first side that cooperates with the base section to define a first aperture, and a second side that cooperates with the base section to define a second aperture. The fastener strip may be fastened to a trim cover and the body portion may be deflected from the plane and inserted into a hog ring lance loop of a seat frame thereby locking a first portion of the hog ring lance loop in the first aperture and a second portion of the hog ring lance loop in the second aperture to secure the trim cover to the seat frame.

17 Claims, 3 Drawing Sheets

FASTENER STRIP

TECHNICAL FIELD OF THE INVENTION

This invention generally relates to fastener strips. More specifically, this invention relates to fastener strips to secure a trim cover of a seat assembly to a conventional hog ring lance loop of a seat frame.

BACKGROUND

In the conventional techniques of the art, a trim cover of a seat assembly is attached to a hog ring lance loop of a seat frame with a hog ring. The hog ring attachment method, which includes piercing the trim cover with the hog ring and bending the hog ring into the hog ring lance loop with a compressive force, is very labor intensive. Because of the labor costs, the manufacturers of seat assemblies desire a new device to secure a trim cover of a seat assembly to a seat frame.

SUMMARY OF THE INVENTION

Accordingly, this invention provides for a fastener strip that overcomes the problems and disadvantages of the conventional techniques in the art. The invention also provides for a fastener strip that may be inserted into a conventional hog ring lance loop of a seat frame. The invention also provides for a fastener strip formed in a plane with a constant depth that is easily manufactured with an extrusion die method.

Briefly, the invention includes a fastener strip for a trim cover of a seat assembly including a base section and a tab section. The tab section includes a hinge portion connected to the base section and a body portion connected to the hinge portion. The base section, the tab section, the hinge portion, and the body portion are formed in a plane. The hinge portion allows the body portion to deflect from the plane. The body portion includes a first side that cooperates with the base section to define a first aperture, and a second side that cooperates with the base section to define a second aperture. The fastener strip may be fastened to a trim cover and the body portion may be deflected from the plane and inserted into a hog ring lance loop of a seat frame thereby locking a first portion of the hog ring lance loop in the first aperture and a second portion of the hog ring lance loop in the second aperture to secure the trim cover to the seat frame.

BRIEF DESCRIPTION OF THE DRAWINGS

Further features and advantages of the invention will become apparent from the following discussion and accompanying drawings, in which.

DETAILED DESCRIPTION OF THE PREFERRED EMBODIMENT

The following description of the preferred embodiment is merely exemplary in nature, and is in no way intended to limit the invention or its application or uses.

Figure 1:
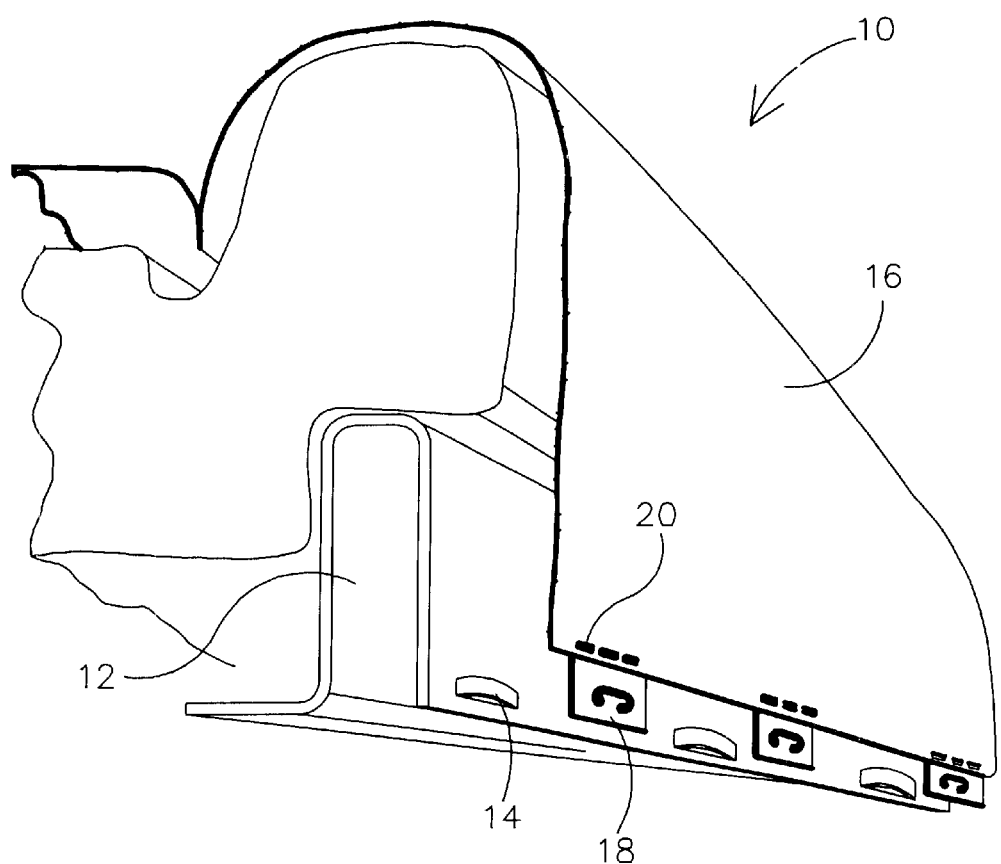
FIG. 1 is a perspective view of the seat assembly of the preferred embodiment of the invention.
Figure 2:
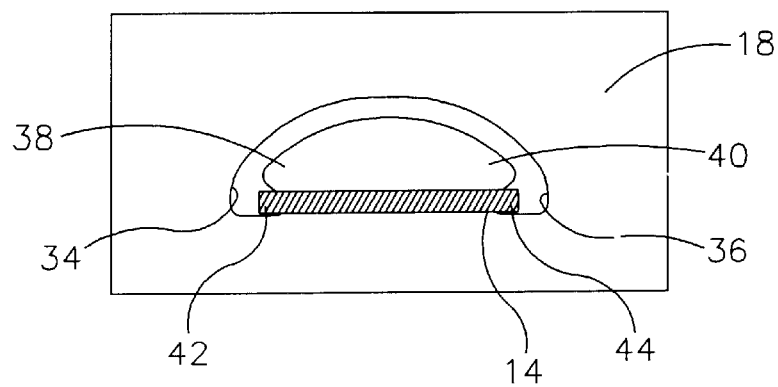
FIG. 2 is a top view of the fastener strip and the hog ring lance loop of the preferred embodiment of the invention.

As shown in FIG. 1, the seat assembly 10 of the invention includes a seat frame 12 having a conventional hog ring lance loop 14, a trim cover 16, and a fastener strip 18. The fastener strip 18 is preferably fastened to the trim cover 16 by a sewn thread 20, but may alternatively be fastened by other suitable methods, such as an adhesive, staple, or extrusion method. The seat frame 12 and the trim cover 16 are made from conventional materials and conventional methods, but may alternatively be made from other suitable materials and other suitable methods. The fastener strip 18 is specifically designed to be inserted into the hog ring lance loop 14 of the seat frame to secure the trim cover to the seat frame, as shown in FIG. 2.

Figure 3:
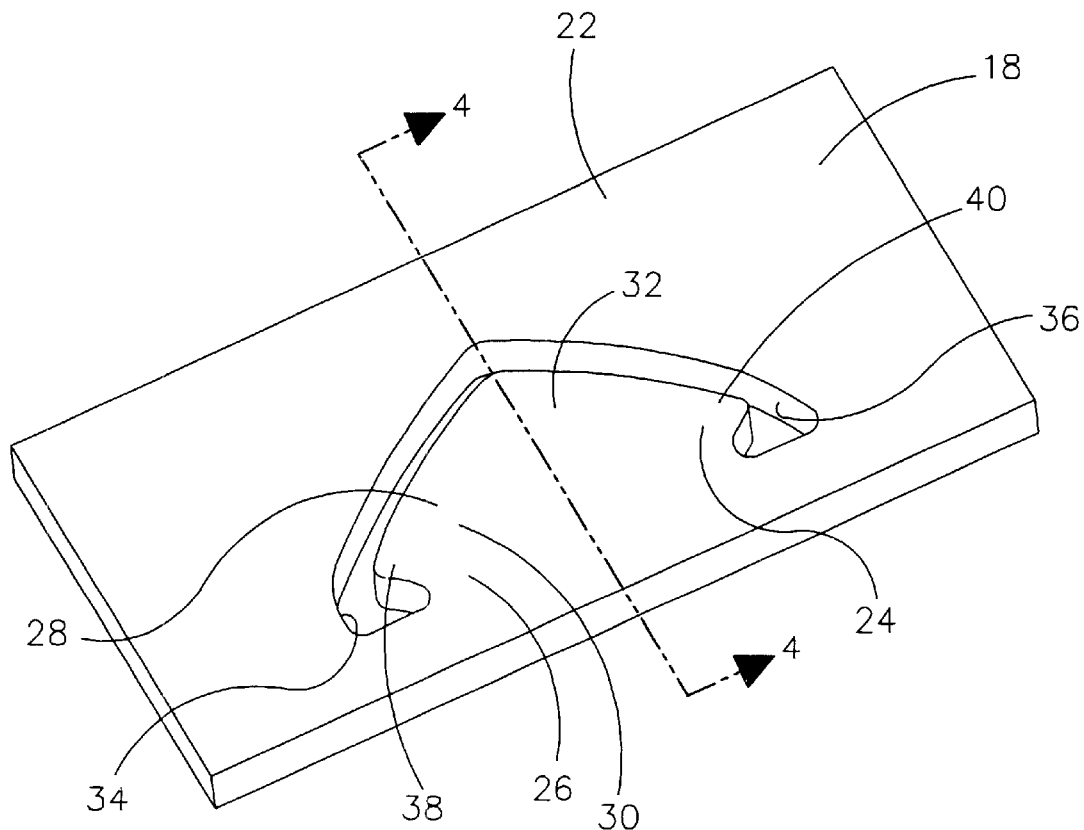
FIG. 3 is a perspective view of the fastener strip of the preferred embodiment of the invention.

As shown in FIG. 3, the fastener strip 18 of the preferred embodiment includes a base section 22, which functions to provide an attachment point for the trim cover, and a tab section 24, which functions to engage the hog ring lance loop of the seat frame. The tab section 24 preferably includes a hinge portion 26 connected to the base section 22 and a body portion 28 connected to the hinge portion 26. The body portion 28 preferably includes a first side 30 and a second side 32. The first side 30 preferably cooperates with the base section 22 to define a first aperture 34, and the second side 32 preferably cooperates with the base section 22 to define a second aperture 36. The base section 22 preferably surrounds the entire tab section 24, but may alternatively surround only the first side 30 and the second side 32 of the tab section 24.

In the preferred embodiment, the tab section 24 further includes a first barb portion 38 connected to and protruding from the first side 30 of the base section 22 and a second barb portion 40 connected to and protruding from the second side 32 of the base section 22. The first barb portion 38 and the second barb portion 40 cooperate with the base section 22 to define the first aperture 34 and the second aperture 36, respectively. As shown in FIG. 2, the first barb portion 38 and the second barb portion 40 facilitate the locking of a first portion 42 of the hog ring lance loop 14 in the first aperture 34 and a second portion 44 of the hog ring lance loop 14 in the second aperture 36. In an alternative embodiment, the tab section may extend from the base section without the first barb portion and the second barb portion.

Figure 4:
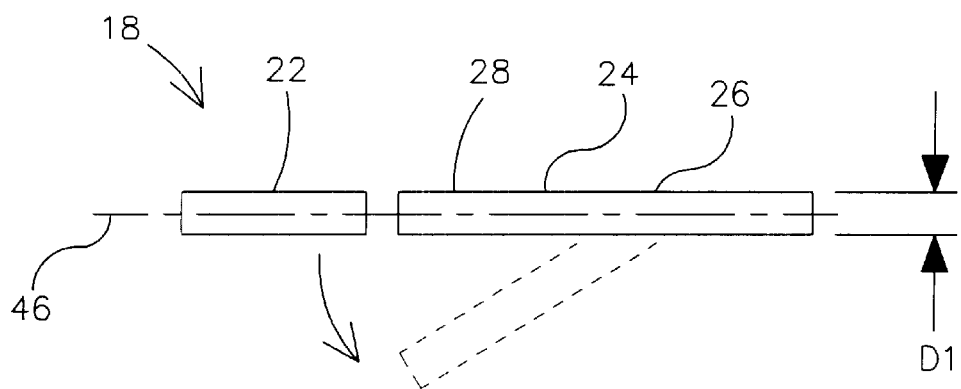
FIG. 4 is a cross-sectional view of the fastener strip of FIG. 3, taken along the line 4—4.

As shown in FIG. 4, the base section 22, the tab section 24, the hinge portion 26, and the body portion 28 are preferably formed in a plane 46. In this manner, the fastener strip 18 preferably has a substantially constant depth D1. With the constant depth D1, the fastener strip 18 is easily manufactured with an extrusion die method, the preferred method of the invention. The fastener strip 18 may alternatively be formed in several planes, with an inconsistent depth, or with other suitable methods.

Figure 5:
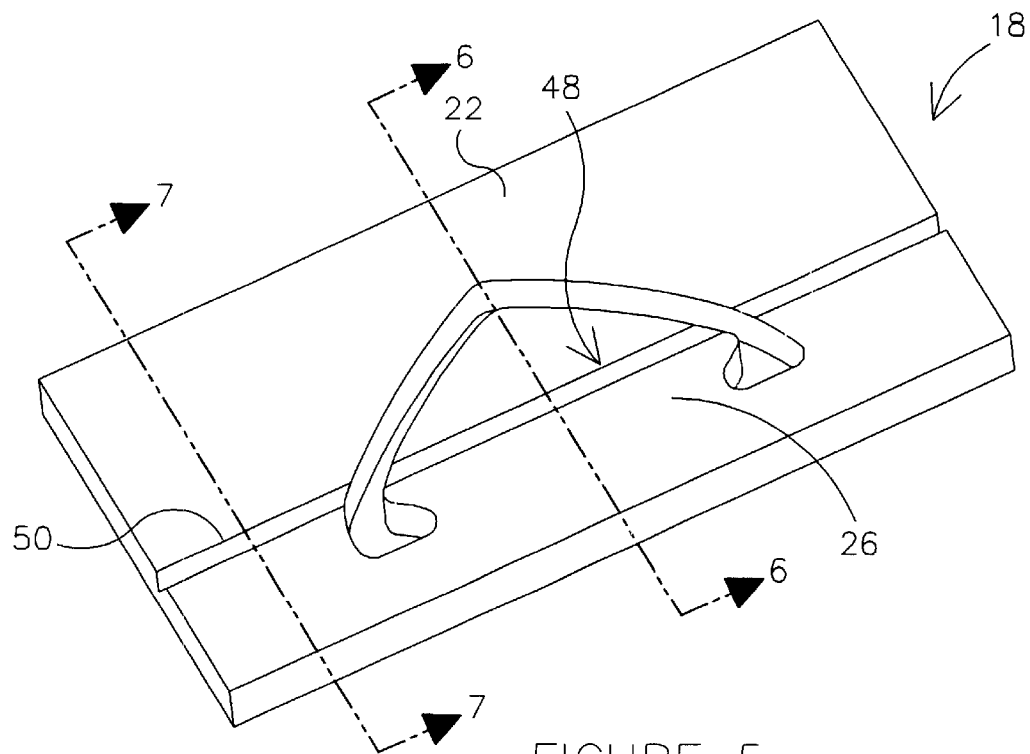
FIG. 5 is a perspective view of the fastener strip of the alternative embodiment of the invention.
Figure 6:
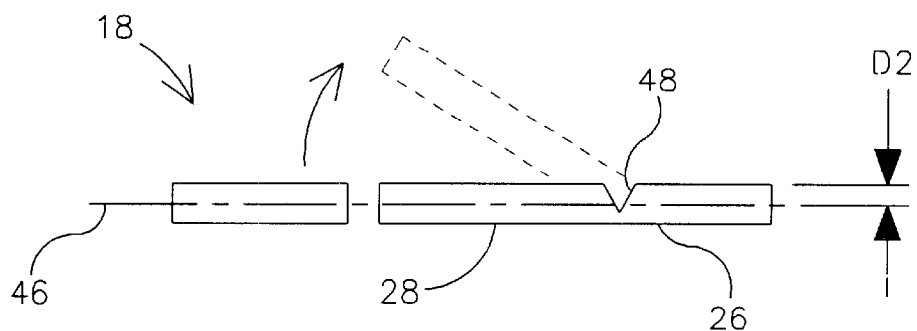
FIG. 6 is a cross-sectional view of the fastener strip of FIG. 5, taken along the line 6—6.
Figure 7:
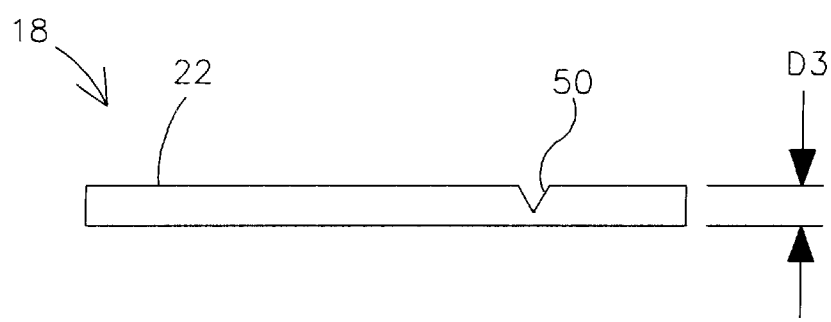
FIG. 7 is a cross-sectional view of the fastener strip of FIG. 5, taken along the line 7—7.

The hinge portion 26 allows the body portion 28 to deflect from the plane 46, which allows the insertion of the body portion 28 into the hog ring lance loop of the seat frame. As shown in FIG. 5, the hinge portion 26 of an alternative embodiment of the invention is manufactured with a hinge portion notch 48. The hinge portion notch 48 functions to facilitate the deflection of the body portion 28 from the plane 46, as shown in FIG. 6. By using appropriate materials for the fastener strip 18 and appropriate dimensions for the hinge portion notch 48, the fastener strip 18 may be designed such that the hinge portion 26 only allows deflection of the body portion 28 in one direction. The hinge portion 26 of the alternative embodiment has a hinge portion 26 depth D2, which is less than a base section depth D3 of the base section 22, as shown in FIG. 6. To facilitate extrusion manufacturing of the fastener strip 18 with a hinge portion notch 48, the base section 22 may be designed with a corresponding base section notch 50, as shown in FIGS. 5 and 7.

In a further alternative embodiment of the invention, the base section 22 may include a base section notch that does not correspond to the hinge portion notch 48. In this manner, the base section notch would allow the bending of the fastener strip 18 around an edge or a corner, such as the edge of the seat frame 12 (shown in FIG. 1).

The fastener strip is preferably made from a resilient material, which allows the deflection and rebound of the body portion. This rebound of the body portion is important for the locking of the hog ring lance loop within the first aperture and the second aperture. The fastener strip is preferably made from a plastic material, such as polypropylene or polyethylene, but may alternatively be formed from other suitable materials. The fastener strip may be made and shipped to a seat assembly manufacturer in a roll to simplify inventory-related costs. In this case, the manufacturer would cut the extended strip into the fastener strip of the invention. The fastener strip could be cut with one or more tab sections.

As understood with reference to the above paragraphs, the method of manufacturing the seat assembly of the invention includes: (a) providing a seat frame having a hog ring lance loop; (b) providing a trim cover; (c) providing a fastener strip having a base section and a tab section including a hinge portion connected to the base section and a body portion connected to the hinge portion, the fastener strip being formed in a plane; (d) fastening the fastener strip to the trim cover; (e) deflecting the body portion from the plane; and (f) inserting the body portion into the hog ring lance loop to secure the trim cover to the seat frame. In the preferred method of the invention, step (c) also includes providing a first barb portion connected to and protruding from a first side of the base section in the plane, and a second barb portion connected to and protruding from a second side of the base section in the plane. Although the steps outline the preferred method of manufacturing the seat assembly of the invention, other steps may be used to provide similar results.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

I claim:

1. A fastener strip for a trim cover of a seat assembly, comprising:

a base section defining a base section notch to allow bending of said base section; and a tab section including a hinge portion connected to said base section and a body portion connected to said hinge portion; said base section, said tab section, said hinge portion, and said body portion being formed in a plane; said hinge portion allowing said body portion to deflect from said plane; said body portion having a first side and a second side, said first side cooperating with said base section to define a first aperture, and said second side cooperating with said base section to define a second aperture;

such that said fastener strip may be fastened to a trim cover and said body portion may be deflected from said plane and inserted into a hog ring lance loop of a seat frame thereby locking a first portion of the hog ring lance loop in said first aperture and a second portion of the hog ring lance loop in said second aperture to secure the trim cover to the seat frame.

2. The fastener strip of claim 1 wherein said tab section further comprises a first barb portion connected to and protruding from said first side of said body portion in said plane, and a second barb portion connected to and protruding from said second side of said body portion in said plane, said first barb portion cooperating with said base section to define said first aperture, and said second barb portion cooperating with said base section to define said second aperture.

3. The fastener strip of claim 1 wherein said base section, said tab section, said hinge portion, and said body portion are integrally formed from a resilient material.

4. The fastener strip of claim 1 wherein said base section surrounds said tab section in said plane.

5. The fastener strip of claim 1 wherein said base section, said tab section, said hinge portion, and said body portion have a substantially constant depth.

6. The fastener strip of claim 1 wherein said hinge portion has a hinge portion depth, said base section has a base portion depth, and said hinge portion depth is less than said base portion depth.

7. The fastener strip of claim 6 wherein said hinge portion defines a hinge portion notch.

8. The fastener strip of claim 7 wherein said base section defines a base section notch corresponding to said hinge portion notch.

9. A seat assembly comprising:

a seat frame having a hog ring lance loop;

a trim cover; and a fastener strip having a base section and a tab section including a hinge portion connected to said base section and a body portion connected to said hinge portion; said base section, said tab section, said hinge portion, and said body portion being formed in a plane; said hinge portion allowing said body portion to deflect from said plane; said body portion having a first side and a second side, said first side cooperating with said base section to define a first aperture, and said second side cooperating with said base section to define a second aperture;

such that said fastener strip may be fastened to said trim cover and said body portion may be deflected from said plane and inserted into said hog ring lance loop of said seat frame thereby locking a first portion of said hog ring lance loop in said first aperture and a second portion of said hog ring lance loop in said second aperture to secure said trim cover to said seat frame.

10. The seat assembly of claim 9 wherein said base section defines a base section notch to allow bending of said base section.

11. The seat assembly of claim 9 wherein said tab section further comprises a first barb portion connected to and protruding from said first side of said body portion in said plane, and a second barb portion connected to and protruding from said second side of said body portion in said plane, said first barb portion cooperating with said base section to define said first aperture, and said second barb portion cooperating with said base section to define said second aperture.

12. The seat assembly of claim 9 wherein said base section, said tab section, said hinge portion, and said body portion are integrally formed from a resilient material.

13. The seat assembly of claim 9 wherein said base section surrounds said tab section in said plane.

14. The seat assembly of claim 9 wherein said base section, said tab section, said hinge portion, and said body portion have a substantially constant depth.

15. The seat assembly of claim 9 wherein said hinge portion has a hinge portion depth, said base section has a base section depth, and said hinge portion depth is less than said base portion depth.

16. The seat assembly of claim 15 wherein said hinge portion defines a hinge portion notch.

17. The seat assembly of claim 16 wherein said base section defines a base section notch corresponding to said hinge portion notch.

* * * * *